Oct. 16, 1923.

J. C. CROMWELL 1,471,143

UNIVERSAL JOINT

Filed Feb. 17, 1920    2 Sheets-Sheet 1

Inventor
John C. Cromwell,
By Bakewell, Byrnes & Parmelee
Attorneys.

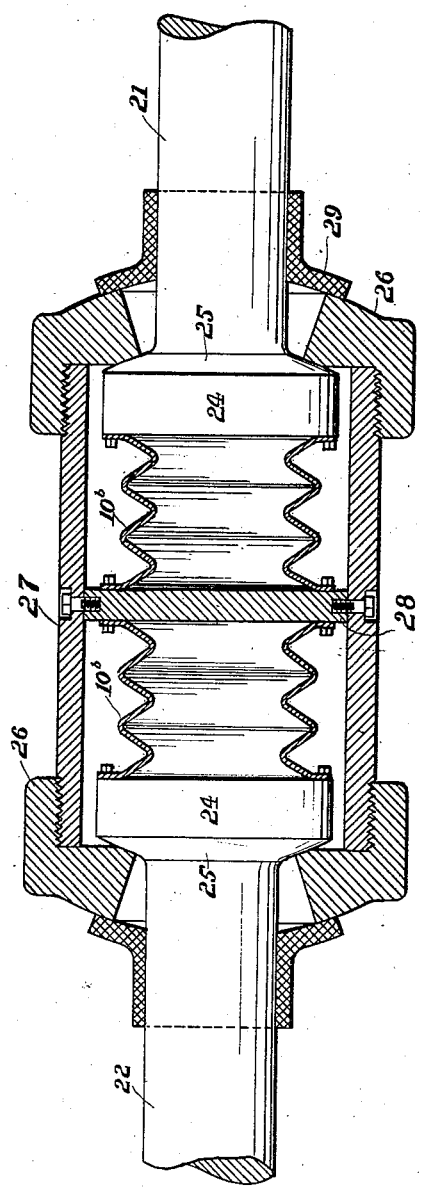

Patented Oct. 16, 1923.

1,471,143

UNITED STATES PATENT OFFICE.

JOHN C. CROMWELL, OF CLEVELAND, OHIO.

UNIVERSAL JOINT.

Application filed February 17, 1920. Serial No. 359,406.

*To all whom it may concern:*

Be it known that I, JOHN C. CROMWELL, a citizen of the United States, residing at Cleveland, in the county of Cuyahoga and State of Ohio, have invented a new and useful Improvement in Universal Joints, of which the following is a full, clear, and exact description.

The present invention relates broadly to flexible joints or connections, and more particularly to joints of the type referred to as universal joints.

The principal object of the present invention is to provide a joint of the character described, comprising a permanent flexible metallic connection between the driving and driven members.

Another object of the invention is to provide a universal joint comprising a flexible driving connection in the form of a corrugated metallic sheet or tube.

Still another object of the present invention is to provide a universal joint having a plurality of independent flexible driving connections each capable of absorbing part of the bending torque independently of the others.

The foregoing and other objects, together with their attendant advantages, will be apparent as the invention becomes better understood by reference to the accompanying specification and drawings forming a part thereof, it being premised that changes may be made in the various details and the manner of operation within the scope of the appended claims without departing from the spirit of the invention.

Figure 3 is a longitudinal sectional view through a compound universal joint.

Figure 1:
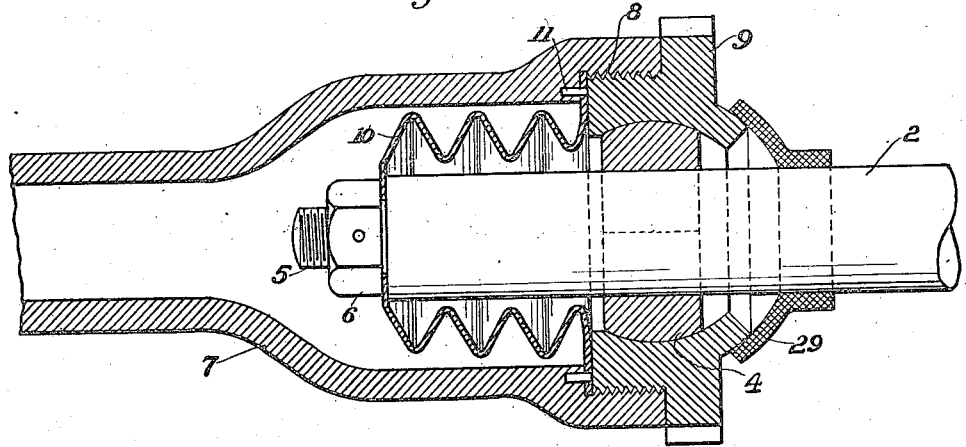
Figure 1 is a longitudinal section through one type of joint constructed in accordance with the present invention.

Referring more particularly to Figure 1 of the drawings, there is illustrated a driving shaft 2 provided with a split bearing 4 of any desired construction. The inner end 5 of the driving shaft is preferably reduced and threaded for the reception of a nut 6.

The driven member co-operating with the driving member 2 comprises a casing 7 suitably enlarged adjacent one end and provided with an internally threaded portion 8 adapted for the reception of a bearing member 9 having a bearing surface adapted to receive and co-operate with the bearing 4. By forming the bearing 4 of two or more parts, as indicated, it may be readily placed in position within the bearing member.

Connecting the driving and driven members is a flexible metallic connection comprising preferably a corrugated tubular member 10 having one end flanged outwardly and provided with openings to pass over the pins 11 carried either by the casing 7 or the bearing member 9. The opposite end of the corrugated flexible connection is flanged inwardly and clamped between the end of the driving shaft 2 and the nut 6. It has been found that by constructing the flexible connection of steel corrugated in the manner illustrated, there is provided sufficient strength for transmitting all of the driving force at the same time providing sufficient flexibility to permit the desired relative movement between the driving and driven members.

Figure 2:
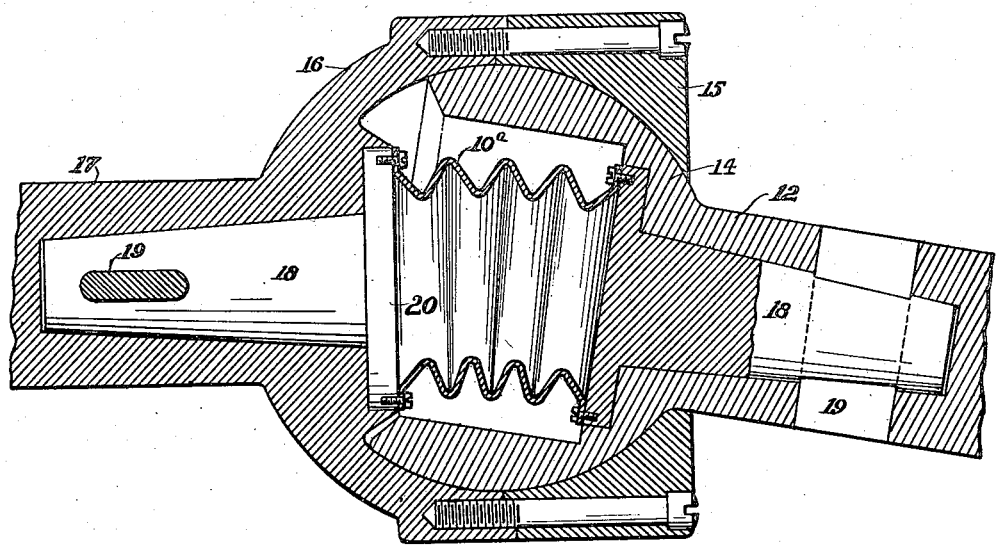
Figure 2 is a longitudinal section through a slightly modified type of connection.

In Figure 2 there is illustrated a slightly modified type of joint comprising a driving member 12 having a hollow spherical head 14 adapted to fit within the detachable bearing members 15 and 16 of the driven member 17. In this type of joint, both the driving and driven members are provided with stub shafts 18 each having a key connection 19, and each provided with an enlarged head 20. Suitably secured between the heads 20 is a flexible connection 10$^a$ similar to the connection 10 illustrated in Figure 1.

In Figure 3 there is illustrated one form of compound joint comprising a driving member 21 and a driven member 22, each provided with heads 24 having a bearing portion 25 co-operating with the bearing members 26 carried by the casing 27. Intermediate the ends of the casing 27 is a partition plate 28 suitably secured to the casing. Intermediate each of the heads 24 and the partition 28 is an independent flexible connection 10$^b$ corresponding to the flexible connections already described. Due to the provision of two flexible connections of this type, it will be apparent that if the relative deflection between the driving and driven members is 10°, each of the connections will independently take care of approximately one-half of the bending torque. In shafts, such as driving shafts for automobiles, where there is a comparatively large amount of deflection at times between the driving and driven members, a joint of this type is highly advantageous as the life of the joint is increased, due to the distribution of the bending torque.

It is well known that during the operation of universal joints there is a considerable variation in speed between the driving and driven members. At times, during each revolution, the driven member rotates faster than the driving member and at other times rotates slower, the change from minimum to maximum variation being a gradual one. The amount of variation, however, increases with each increase in the angular difference, or deflection, between the driving and driven members, but the rate of increase is greater. For example, if the angular difference is ten degrees, the amount of variation is about four times that which exists with an angular difference of but five degrees. In view of this, it will be readily understood that with a compound, or two-in-one, joint where each connection takes care of one-half of the angular difference, the amount of variation is substantially reduced by half, and the resultant jerk correspondingly reduced.

Any of the types of connections may be provided with flexible dirt excluding diaphragms 29 of any usual construction.

The advantages of the present invention arise from a universal joint having a permanent flexible metallic driving connection between the driving and driven members.

Further advantages arise from a construction employing a plurality of such flexible connections whereby the wear on each of the connections is minimized. It will be apparent that the terms "driving" and "driven" members appearing throughout the specification and claims may refer to either of the parts, as the power may be applied to either of these members.

I claim:

1. A universal joint, comprising a driving member, a driven member, and a plurality of metallic flexible tubular driving connections between said members, substantially as described.

2. A universal joint, comprising a driving member, a driven member, and a plurality of corrugated tubular driving connections between said members, substantially as described.

3. A universal joint, comprising a driving member, a driven member, a bearing surface formed on one of said members, a bearing carried by the other of said members and co-operating therewith, and a corrugated driving connection between said members, substantially as described.

4. A universal joint, comprising a driving member, a driven member, a bearing surface formed on one of said members, a bearing carried by the other of said members and co-operating therewith, and a metallic flexible tubular driving connection between said members, substantially as described.

5. A universal joint, comprising a driving member, a driven member, a bearing surface formed on one of said members, a bearing carried by the other of said members and co-operating therewith, and a corrugated tubular driving connection between said members, substantially as described.

6. A universal joint, comprising a driving member, a driven member, a bearing surface formed on one of said members, a bearing carried by the other of said members and co-operating therewith, and a plurality of corrugated driving connections between said members, substantially as described.

7. A universal joint, comprising a driving member, a driven member, a bearing surface formed on each of said members, bearings co-operating therewith, and a plurality of metallic flexible tubular driving connections between said members, substantially as described.

8. A universal joint, comprising a driving member, a driven member, a bearing surface formed on each of said members, bearings co-operating therewith, and a plurality of corrugated tubular driving connections between said members, substantially as described.

9. A universal joint, comprising a casing, a driven member extending into one end of said casing, a driving member extending into the other end of said casing, a partition intermediate the ends of said casing, and independent metallic flexible driving connections between said members and said partition, substantially as described.

10. A universal joint, comprising a casing, a driven member extending into one end of said casing, a driving member extending into the other end of said casing, a partition intermediate the ends of said casing, and independent corrugated tubular driving connections between said members and said partition, substantially as described.

11. A universal joint, comprising a casing, a driven member co-operating with one end of said casing, a driving member co-operating with the opposite end of said casing, bearings between said members and said casing, a partition intermediate the ends of said casing, and a plurality of independent flexible tubular driving connections between said members and said partition, substantially as described.

12. A universal joint, comprising a driving member, a driven member, a partition, and a plurality of independent flexible tubular driving connections between the driving and driven members and said partition, each of said connections absorbing substantially half of the angular deflection between said members, substantially as described.

13. A joint for minimizing speed variations, comprising a driving member, a driven member, and a plurality of independently operable corrugated tubular driving connections between the adjacent ends of said members, substantially as described.

14. In a universal joint adapted to couple a driving and a driven shaft, a resilient casing in bellows form having its two ends fixed respectively to the two shafts so as to afford a power-transmitting member and a hollow container surrounding said casing and made in two parts forming a ball and socket joint.

15. A universal joint, comprising a driving member, a driven member, a plurality of metallic flexible driving connections between said members, a partition separating said connections, and a rigid casing enclosing said connections and carrying said partition, substantially as described.

16. A universal joint, comprising a driving member, a driven member, a partition, a plurality of independent flexible driving connections between the driving and driven members and said partition, each of said connections absorbing substantially half of the angular deflection between said members, and a rigid tubular casing enclosing said driving connections and carrying said partition, substantially as described.

In testimony whereof, I have hereunto set my hand.

JOHN C. CROMWELL.